US007248149B2

(12) United States Patent
Bachelder et al.

(10) Patent No.: US 7,248,149 B2
(45) Date of Patent: Jul. 24, 2007

(54) DETECTION AND ENFORCEMENT OF FAILURE-TO-YIELD IN AN EMERGENCY VEHICLE PREEMPTION SYSTEM

(75) Inventors: Aaron Bachelder, Irvine, CA (US); Richard Wickline, Encino, CA (US)

(73) Assignees: California Institute of Technology, Pasadena, CA (US); E-Views Safety Systems, Inc., Agoura Hills, CA (US)

( * ) Notice: Subject to any disclaimer, the term of this patent is extended or adjusted under 35 U.S.C. 154(b) by 20 days.

(21) Appl. No.: 10/960,129

(22) Filed: Oct. 6, 2004

(65) Prior Publication Data

US 2005/0116838 A1 Jun. 2, 2005

Related U.S. Application Data

(60) Provisional application No. 60/509,206, filed on Oct. 6, 2003.

(51) Int. Cl.

*B60Q 1/00* (2006.01)
*G08G 1/01* (2006.01)
*G08G 1/017* (2006.01)
*G08F 19/00* (2006.01)

(52) U.S. Cl. .................. 340/425.5; 340/933; 340/937; 701/119

(58) Field of Classification Search ..................... None
See application file for complete search history.

(56) References Cited

U.S. PATENT DOCUMENTS 3,550,078 A 12/1970 Long
3,831,039 A 8/1974 Henschel
3,859,624 A 1/1975 Kriofsky et al.
3,881,169 A 4/1975 Malach (Continued)

FOREIGN PATENT DOCUMENTS

EP 0 574 009 A2 12/1993

(Continued)

OTHER PUBLICATIONS

Co-pending U.S. Appl. No. 10/642,435, filed Aug. 15, 2003, entitled Emergency Vehicle Traffic Signal Preemption System.

(Continued)

*Primary Examiner*—Julie Bichngoc Lieu
(74) *Attorney, Agent, or Firm*—Christie Parker & Hale, LLP.

(57) ABSTRACT

An intersection controlled by an intersection controller receives trigger signals from on-coming emergency vehicles responding to an emergency call. The intersection controller initiates surveillance of the intersection via cameras installed at the intersection in response to a received trigger signal. The surveillance may begin immediately upon receipt of the trigger signal from an emergency vehicle, or may wait until the intersection controller determines that the signaling emergency vehicle is in the field of view of the cameras at the intersection. Portions of the captured images are tagged by the intersection controller based on tag signals transmitted by the vehicle or based on detected traffic patterns that indicate a potential traffic violation. The captured images are downloaded to a processing facility that analyzes the images and automatically issues citations for captured traffic violations.

25 Claims, 4 Drawing Sheets

U.S. PATENT DOCUMENTS

| | | | |
|---|---|---|---|
| 3,886,515 A | 5/1975 | Cottin et al. | |
| 4,017,825 A | 4/1977 | Pichey | |
| 4,162,477 A | 7/1979 | Munkberg | |
| 4,223,295 A | 9/1980 | Bonner et al. | |
| 4,230,992 A | 10/1980 | Munkberg | |
| 4,234,967 A | 11/1980 | Henschel | |
| 4,296,400 A | 10/1981 | Becker Friedbert et al. | |
| 4,433,324 A | 2/1984 | Guillot | |
| 4,443,783 A | 4/1984 | Mitchell | |
| 4,573,049 A | 2/1986 | Obeck | |
| 4,661,799 A | 4/1987 | Buttemer | |
| 4,701,760 A | 10/1987 | Raoux | |
| 4,704,610 A | 11/1987 | Smith et al. | |
| 4,713,661 A | 12/1987 | Boone et al. | |
| 4,734,863 A | 3/1988 | Honey et al. | |
| 4,734,881 A | 3/1988 | Klein et al. | |
| 4,775,865 A | 10/1988 | Smith et al. | |
| 4,791,571 A | 12/1988 | Takahashi et al. | |
| 4,799,162 A | 1/1989 | Shinkawa et al. | |
| 4,914,434 A | 4/1990 | Morgan et al. | |
| 4,963,889 A | 10/1990 | Hatch | |
| 5,014,052 A | 5/1991 | Obeck | |
| 5,043,736 A | 8/1991 | Darnell et al. | |
| 5,068,656 A | 11/1991 | Sutherland | |
| 5,072,227 A | 12/1991 | Hatch | |
| 5,083,125 A | 1/1992 | Brown et al. | |
| 5,089,815 A | 2/1992 | Potter et al. | |
| 5,119,102 A | 6/1992 | Barnard | |
| 5,172,113 A | 12/1992 | Hamer | |
| 5,177,489 A | 1/1993 | Hatch | |
| 5,187,373 A | 2/1993 | Gregori | |
| 5,187,476 A | 2/1993 | Hamer | |
| 5,204,675 A | 4/1993 | Sekine | |
| 5,214,757 A | 5/1993 | Mauney et al. | |
| 5,334,974 A | 8/1994 | Simms et al. | |
| 5,345,232 A | 9/1994 | Robertson | |
| 5,515,042 A * | 5/1996 | Nelson | 340/937 |
| 5,539,398 A | 7/1996 | Hall et al. | |
| 5,602,739 A | 2/1997 | Haagenstad et al. | |
| 5,710,555 A | 1/1998 | McConnell et al. | |
| 5,745,865 A | 4/1998 | Rostoker et al. | |
| 5,889,475 A | 3/1999 | Klosinski et al. | |
| 5,926,113 A | 7/1999 | Jones et al. | |
| 5,955,968 A | 9/1999 | Bentrott et al. | |
| 5,986,575 A | 11/1999 | Jones et al. | |
| 6,064,319 A | 5/2000 | Matta | |
| 6,087,961 A | 7/2000 | Markow | |
| 6,232,889 B1 | 5/2001 | Apitz et al. | |
| 6,243,026 B1 | 6/2001 | Jones et al. | |
| 6,326,903 B1 | 12/2001 | Gross et al. | |
| 6,339,382 B1 | 1/2002 | Arbinger et al. | |
| 6,577,946 B2 | 6/2003 | Myr | |
| 6,603,975 B1 | 8/2003 | Inouchi et al. | |
| 6,617,981 B2 | 9/2003 | Basinger | |
| 6,621,420 B1 | 9/2003 | Poursartip | |
| 6,633,238 B2 | 10/2003 | Lemelson et al. | |
| 6,690,293 B2 | 2/2004 | Amita | |
| 6,724,320 B2 | 4/2004 | Basson et al. | |
| 6,807,464 B2 | 10/2004 | Yu et al. | |
| 6,909,380 B2 | 6/2005 | Brooke | |
| 6,970,102 B2 | 11/2005 | Ciolli | |
| 6,985,827 B2 * | 1/2006 | Williams et al. | 702/142 |
| 2001/0037203 A1 | 11/2001 | Satoh | |
| 2003/0095688 A1 | 5/2003 | Kirmuss | |
| 2003/0164775 A1 | 9/2003 | Hutchison et al. | |
| 2004/0196162 A1 | 10/2004 | Brooke | |

FOREIGN PATENT DOCUMENTS

| | | |
|---|---|---|
| FR | 2 670 002 A1 | 6/1992 |
| FR | 2 693 820 A1 | 1/1994 |

OTHER PUBLICATIONS

Co-pending U.S. Appl. No. 10/704,530, filed Nov. 7, 2003, entitled Method and System for Beacon/Heading Emergency Vehicle Intersection Preemption.

Co-pending U.S. Appl. No. 10/811,075, filed Mar. 24, 2004, entitled Emergency Vehicle Traffic Signal Preemption System.

Co-pending U.S. Appl. No. 10/696,490, filed Oct. 28, 2003, entitled Method and Apparatus for Alerting Civilian Motorists to the Approach of Emergency Vehicles.

Co-pendng U.S. Appl. No. 10/965,408, filed Oct. 12, 2004, entitled Traffic Preemption System.

Co-pending U.S. Appl. No. 10/942,498, filed Sep. 15, 2004, entitled Forwarding System for Long-Range Preemption and Corridor Clearance for Emergency Response.

Co-pending U.S. Appl. No. 10/410,582, filed Apr. 8, 2003, entitled Emergency Vehicle Control System Traffic Loop Preemption.

*Intelligent Investment,* World Highways/Routes Du Monde, Jan./Feb. 1997, p. 52.

*Traffic Preemption System for Emergency Vehicles Based on Differential GPS and Two-Way Radio*, Priority One GPS, Midwest Traffic Products, Inc., 4 pages.

*Traffic Signal Preemption for Emergency and Transit Vehicles Based on Differential GPS & Two-Way Radio*, Priority One GPS, Traffic Preemption System, 3 pgs.

*GPS and Radio Based Traffic Signal Preemption System for Emergency Vehicles*, Priority One GPS Specification for Emergency Vehicles, 7 pgs.

Emergency Preemption Systems, Inc. website, 2 pgs.

Sonic Systems website, *Traffic Preemption and Priority Systems*, 2 pgs.

*Strobecom I Optical Preemption Detector*, 1 pg.

*Strobecom I Preemption Detector Assemblies*, 2 pgs.

*Strobecom I Interface Card and Card Cage*, 2 pgs.

*The Priority One GPS Concept for Emergency Vehicles*, http://www.mtp-gps.com/concept.html, Priority One GPS, 1 pg.

*Priority One GPS Traffic Preemption Hardware*, http://www.mtp-gps.com/hardware.html, Priority One GPS, 2 pgs.

*The Traffic Preemption System for Emergency Vehicles Based on Differential GPS and Two-Way Radio*, http://www.greenf.com/traffic.htm, Greenfield Associates website, 1999, 6 pgs.

Zhaosheng Yang and Deyong Guan, *Study on the Scheme of Traffic Signal Timing for Priority Vehicles Based on Navigation System*, 2001 IEEE, pp. 249-254.

Veerender Kaul, *Microwave Technology: Will it Threaten the Dominance of Optical Signal Preemption Systems*?, May 8, 2002, 5 pgs.

Horst E. Gerland, *Traffic Signal Priority Tool to Increase Service Quality and Efficiency*, Prepared for: APTA Bus Operations Conference 2000, Salem Apr. 2000, 9 pgs.

M. Miyawaki, et al., *Fast Emergency Preemption Systems* (*FAST*), 1999 IEEE, pp. 993-997.

K. Fox et al., *UTMCO1 Selected Vehicle Priority in the UTMC Environment* (*UTMC01*), UTMC01 Project Report 1—Part A, Oct. 19, 1998, 45 pgs.

U.S. Department of Transportation, *Advanced Transportation Management Technologies*, Chapter 6, Transit-Management Systems, Publication No. FHWA-SA-97-058, Apr. 1997, pp. 6-1 through 6-23.

J.D. Nelson, et al., *The Modelling of Realistic Automatic Vehicle Locationing Systems for Service and Traffic Control*, Nov. 9-11, 1995, pp. 1582-1587.

*Assessment of the Application of Automatic Vehicle Identification Technology to Traffic Management*, Appendix C: Evaluation of Potential Applications of Automatic Vehicle Monitoring to Traffic Management, Federal Highway Administration, Jul. 1977, 28 pgs.

Robert N. Taube, *Bus Actuated Signal Preemption Systems: A Planning Methodology*, Department of Systems-Design, University of Wisconsin-Milwaukee, May 1976, 120 pgs.

*Assessment of the Application of Automatic Vehicle Identification Technology to Traffic Management*, Federal Highway Administration, Jul. 1977, 44 pgs.

R. M. Griffin and D. Johnson, *A report on the first part of the Northampton Fire Priority Demonstration Scheme-the 'before' study and EVADE*, Crown Copyright 1980, 4 pgs.
P. M. Cleal, *Priority for Emergency Vehicles at Traffic Signals*, Civil Engineering Working Paper, Monash University, Dec. 1982, 38 pgs.
P. Davies, et al., *Automatic Vehicle Identification for Transportation Monitoring and Control*, 1986, pp. 207-224.
N. B. Hounsell, *Active Bus Priority at Traffic Signals*, UK Developments in Road Traffic Signaling, IEEE Colloquium, May 5, 1988, 5 pgs.
C. B. Harris, et al., *Digital Map Dependent Functions of Automatic Vehicle Location Systems*, 1988 IEEE, pp. 79-87.
P. L. Belcher and I. Catling, *Autoguide-Electronic Route Guidance for London and the U.K.*, 1989 IEEE Road Traffic Monitoring, pp. 182-190.
N. Ayland and P. Davies, *Automatic Vehicle Identification for Heavy Vehicle Monitoring*, 1989 IEEE Road Traffic Monitoring, pp. 152-155.
K. Keen, *Traffic Control at a Strategic Level*, 1989 IEEE Road Traffic Monitoring, pp. 156-160.
K. W. Huddart, *Chapter 7: Urban Traffic Control*, Mobile Information Systems, 1990 Artech House, Inc., 23 pgs.
S. Yagar and E. R. Case, *A Role for VNIS in Real-Time Control of Signalized Networks*?, 1991, pp. 1105-1109.
R. F. Casey, et al., *Advanced Public Transportation Systems: The State of the Art*, U.S. Department of Transportation, Apr. 1991, 91 pgs.
M. F. McGurrin, et al., *Alternative Architectures for ATIS and ATMS*, IVHS Proceedngs, May 1992, pp. 456-467.
A. Ceder and A. Shilovits, *A Traffic Signalization Control System with Enhancement Information and Control Capabilities*, 1992 Road Transport Informatics Intelligent Vehicle Highway Systems. pp. 325-333.
*Summary of Findings: Orange County IVHS Review*, Orange County Intelligent Vehicle/Highway Systems Study, JHK & Associates, Aug. 11, 1992, 86 pgs.
*Automatic Vehicle Location/Control and Traffic Signal Preemption Lessons from Europe*, Chicago Transit Authority, Sep. 1992, 140 pgs.
J.D. Nelson et al., *Approaches to the Provision of Priority for Public Transport at Traffic Signals: A European Perspective*, Traffic Engineering Control, Sep. 1993, pp. 426-428.
M. D. Cheslow and S. G. Hatcher, *Estimation of Communication Load Requirements for Five ATIS/ATMS Architectures*, 1993 Proceedings of the IVHS America, pp. 473-479.
M. Kihl and D. Shinn, *Improving Interbus Transfer with Automatic Vehicle Location Year One Report*, Aug. 1993, 35 pgs.
Gunnar Andersson, article entitled *Fleet Management in Public Transport*, The 3rd International Conference on Vehicle Navigation & Information Systems, Oslo, Sep. 2-4, 1992, pp. 312-317.
James R. Helmer, *Intelligent Vehicle Highway Systems at Work in San Jose, California*, pp. 345-347.
Horst E. Gerland, *ITS Intelligent Transportation System: Fleet Management with GPS Dead Reckoning, Advance Displays, Smartcards, etc.*, IEEE-IEE Vehicle Navigation & Information Systems Conference, Ottawa—VNIS '93, pp. 606-611.
Robert F. Casey, M.S., Lawrence N. Labell, M.S., *Evaluation Plan for AVL Implementation in Four U.S. Cities*, May 17-20, 1992 IVHS America Proceedings, 11 pgs.
N.B. Hounsell and M. McDonald, Contractor Report 88, Transport and Road Research Laboratory, Department of Transport, *Bus priority by selective detection cover*, p. 8, p. 22.
David A. Blackledge et al., *Electronic Passenger Information—Do They Give the Public What They Want*?, PTRC 19th Summer, Sep. 9-13, 1991 Annual Meeting, pp. 163-176.
American City & County Website, http://www.americancityandcounty.com, *City uses technology to track buses, emergency vehicles*, Jun. 1, 2001, 1 pg.
A. Kirson et al., *The Evolution of ADVANCE*, Development and Operational Test of a Probe-Based Driver Information System in an Arterial Street Network: a Progress Report, The 3rd International Conference on Vehicle Navigation & Information Systems, pp. 516-517.
Volume Two, The Proceedings of the 1992 Annual Meeting of IVHS America, Surface Transportation and the Information Age, May 17-20, 1992, Newport Beach, CA, 13 pgs.
Labell et al., *Advanced Public Transporation Systems: The State of the Art, Update '92*, U.S. Department of Transportation Federal Transit Administration, 97 pgs.
Stearns et al., *Denver RTD's Computer Aided Dispatch/Automatic Vehicle Location System: the Human Factors Consequences*, U.S. Department of Tranportation, Federal Transit Administration, Sep. 1999, 82 pgs.
APTS Project Summaries, http://www.itsdocs.fhwa.dot.gov, *Advanced Public Transportation Systems (APTS) Project Summaries*, Jun. 1996, Office of Mobility Innovation, 33 pgs.
Brendon Hemily, PhD., *Automatic Vehicle Location in Canadian Urban Transit; a Review of Practice and Key Issues*, Dec. 1988, AATT Conference Feb. 1989, pp. 229-233.
Canadian Urban Transit Association, *Proceedings, The International Conference on Automatic Vehicle Location in Urban Transit Systems*, Sep. 19-21, 1988, Ottawa, Canada, 17 pgs.
1991 TAC Annual Conference, *Proceedings*, vol. 4, Transportation: Toward a Better Environment, 21 pgs.
Casey et al., *Advanced Public Transporatation Systems: The State of the Art*, U.S. Department of Transportation Urban Mass Transportation Administration, Component of Departmental IVHS Initiative, Apr. 1991, 91 pgs.
U.S. Department of Transportation, *German "Smart-Bus" Systems, Potential for Application in Portland, Oregon, vol. 1, Technical Report*, Jan. 1993, Office of Technical Assistance and Safety, Advanced Public Transporation Systems Program, A Component of the Departmental IVHS Initiative, 107 pgs.
ARUP, *Traffic Management for Bus Operations Main Report*, Prepared by Ove Arup Transporation Planning for the Public Transport Corporation, Dec. 1989, 123 pgs (front and back).
Randy D. Hoffman, et al. *DGPS, IVHS Drive GPS Toward Its Future*, GPS World Showcase, Dec. 1992, 1 pg.
Ivan A. Getting, *Getting-The Global Positioning System*, IEEE Spectrum, Dec. 1993, pp. 37-38, 43-47.
IVHS Study—Strategic Plan, Centennial Engineering, Inc., p. 31.
Horst E. Gerland, *FOCCS—Flexible Operation Command and Control System for Public Transport*, PTRC 19th Summer Sep. 9-13, 1991 Annual Meeting, pp. 139-150.
L. Sabounghi et al., *The Universal Close-Range Road/Vehicle Communication System Concept The Numerous Applications of the Enhanced AVI*, 1991 TAC Annual Conference, pp. A41, A43-A62.
R. L. Sabounghi, *Intelligent Vehicle Highway System—The Universal Close-Range Road/Vehicle Communication System Concept—The Enhanced AVI and Its CVO Applications*, 1991, VNIS '91, Vehicle Indication and Information Systems Conference Proceedings, pp. 957-967.
Clarioni, et al., *Public Transport Fleet Location System Based on DGPS Integrated with Dead Reckoning*, Road Vehicle Automation, Jul. 12, 1993, pp. 259-268.
Bernard Held, *Bus Priority: A Focus on the City of Melbourne*, Aug. 1990, Monash University, pp. 157-160, and 180-189.

* cited by examiner

DETECTION AND ENFORCEMENT OF FAILURE-TO-YIELD IN AN EMERGENCY VEHICLE PREEMPTION SYSTEM

CROSS-REFERENCE TO RELATED APPLICATION(S)

This application claims the benefit of U.S. Provisional Application No. 60/509,206 filed on Oct. 6, 2003, the content of which is incorporated herein by reference. This application also contains subject matter that is related to the subject matter disclosed in U.S. patent application Ser. No. 10/811,075, the content of which is incorporated herein by reference.

STATEMENT REGARDING FEDERALLY SPONSORED RESEARCH OR DEVELOPMENT

The invention described herein was made in the performance of work under a NASA contract, and is subject to the provisions of Public Law 96-517 (35 U.S.C. § 202) in which the Contractor has elected to retain title.

FIELD OF THE INVENTION

The present invention relates generally to traffic signal control systems, and more specifically, to traffic signal preemption systems equipped to detect and penalize vehicles failing to yield to emergency vehicles.

BACKGROUND OF THE INVENTION

Emergency vehicles, such as police cars, ambulances, and fire trucks, must swiftly make their ways to respond to what may often be life-threatening emergencies. In order to promote the swift and safe passage of such emergency vehicles, visual and audio alarms including horns, sirens, and lights are utilized to clear the path of the emergency vehicles. Systems have also been developed to preempt traffic signals as the emergency vehicles approach a street intersection controlled by such traffic signals, to give the emergency vehicles the right of way while alerting and stopping other vehicles and pedestrians.

Despite various mechanisms to aid the swift and safe travel of emergency vehicles, these vehicles are often hindered by motorists who ignore the sirens, flashing lights, and/or preempted signals, and fail to yield their way to the emergency vehicles. Such motorists may not only violate traffic laws requiring that they yield to emergency vehicles responding to emergency calls, but may also impede a quick response to the emergency calls and put at risk the lives of the emergency responders.

Nonetheless, offending motorists are rarely if at all penalized for their behavior. Even if the emergency responder who is hindered by an offending motorist is a police officer, the police officer rarely has the opportunity to divert from an emergency call to handle the offense. Accordingly, what is needed is a system and method for detecting and penalizing motorists who fail to yield to emergency vehicles.

SUMMARY OF THE INVENTION

According to one embodiment, the present invention is directed to a system for detecting and enforcing violation of traffic laws. The system includes a transmitter wirelessly transmitting a trigger signal, at least one image capture device capturing a plurality of images within a view area of the image capture device, a controller unit in communication with the transmitter and the image capture device, and a processing unit in communication with the controller unit. The controller unit receives the trigger signal from the transmitter and in response, transmits an image capture command to the image capture device for initiating capture of the plurality of images. The controller unit further tags a portion of the captured images where the tagged portion includes images associated with a violation of a traffic law. The processing unit receives the captured images and analyzes the tagged portion of the captured images. The processing unit automatically issues a citation for the violation of the traffic law associated with the tagged portion.

According to one embodiment, the controller unit preempts traffic signals at a street intersection in response to the trigger signal.

According to one embodiment, the view area of the image capture device includes at least a portion of a street intersection.

According to one embodiment, the violation of the traffic law is a failure to yield to an emergency vehicle.

According to one embodiment, the transmitter is included in a vehicle, and the trigger includes position information of the vehicle. Based on the position information, the controller unit determines a start of a surveillance period and transmits the image capture command at the start of the surveillance period. The start of the surveillance period may correspond to an estimated arrival time of the vehicle at a surveillance zone. The surveillance zone may be defined by the view area of the image capture device.

According to one embodiment, the tagging of the portion of the captured images may be in response to receipt of a second signal from the transmitter, or in response to a determination that a potential traffic violation exists based on data output by a traffic loop detector.

According to another embodiment, the present invention is directed to a controller unit in a system for detecting and enforcing violation of traffic laws. The controller unit includes a receiver wirelessly receiving a trigger signal from a vehicle. A microprocessor included in the controller unit determines, based on the trigger signal, whether the vehicle is in a predetermined surveillance zone. The microprocessor is coupled to a camera controller that actuates an image capture device in response to a determination that the vehicle is in the predetermined surveillance zone. The microprocessor is configured to tag a portion of the captured images, where the tagged portion includes images associated with a violation of a traffic law. The controller unit further includes a data store storing the captured images, and a data communications link for transmitting the stored images to a processing unit. The processing unit analyzes the tagged portion of the captured images and automatically issues a citation for the violation of the traffic law associated with the tagged portion.

According to another embodiment, the present invention is directed to a processing unit in communication with a controller unit actuating an image capture device to capture images during a surveillance period. The controller unit further tags a portion of the captured images where the tagged portion includes images associated with a violation of a traffic law. The processing unit includes a computer that receives the captured images from the controller unit. The computer is configured with software that automatically analyzes the tagged portion of the captured images and automatically issues a citation for the violation of the traffic law associated with the tagged portion.

According to yet a further embodiment, the present invention is directed to a computer-implemented method for detecting and enforcing violation of traffic laws. The method includes: wirelessly receiving a trigger signal from a vehicle; determining, based on the trigger signal, whether the vehicle is in a predetermined surveillance zone; actuating the image capture device in response to a determination that the vehicle is in the predetermined surveillance zone; tagging a portion of the captured images, the tagged portion including images associated with a violation of a traffic law; storing the captured images; and transmitting the stored images to a processing unit. The processing unit analyzes the tagged portion of the captured images and automatically issues a citation for the violation of the traffic law associated with the tagged portion.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

In general terms, the various embodiments of the present invention are directed to visually detecting motorists who fail to yield to preempting vehicles, such as, for example, vehicles operated by emergency responders, and penalizing such motorists via issuance of citations and tickets. The visual detection may be accomplished via a visual surveillance system including a video camera, still camera, or any other device capable of outputting a digital image (collectively referred to as a camera).

Figure 1:
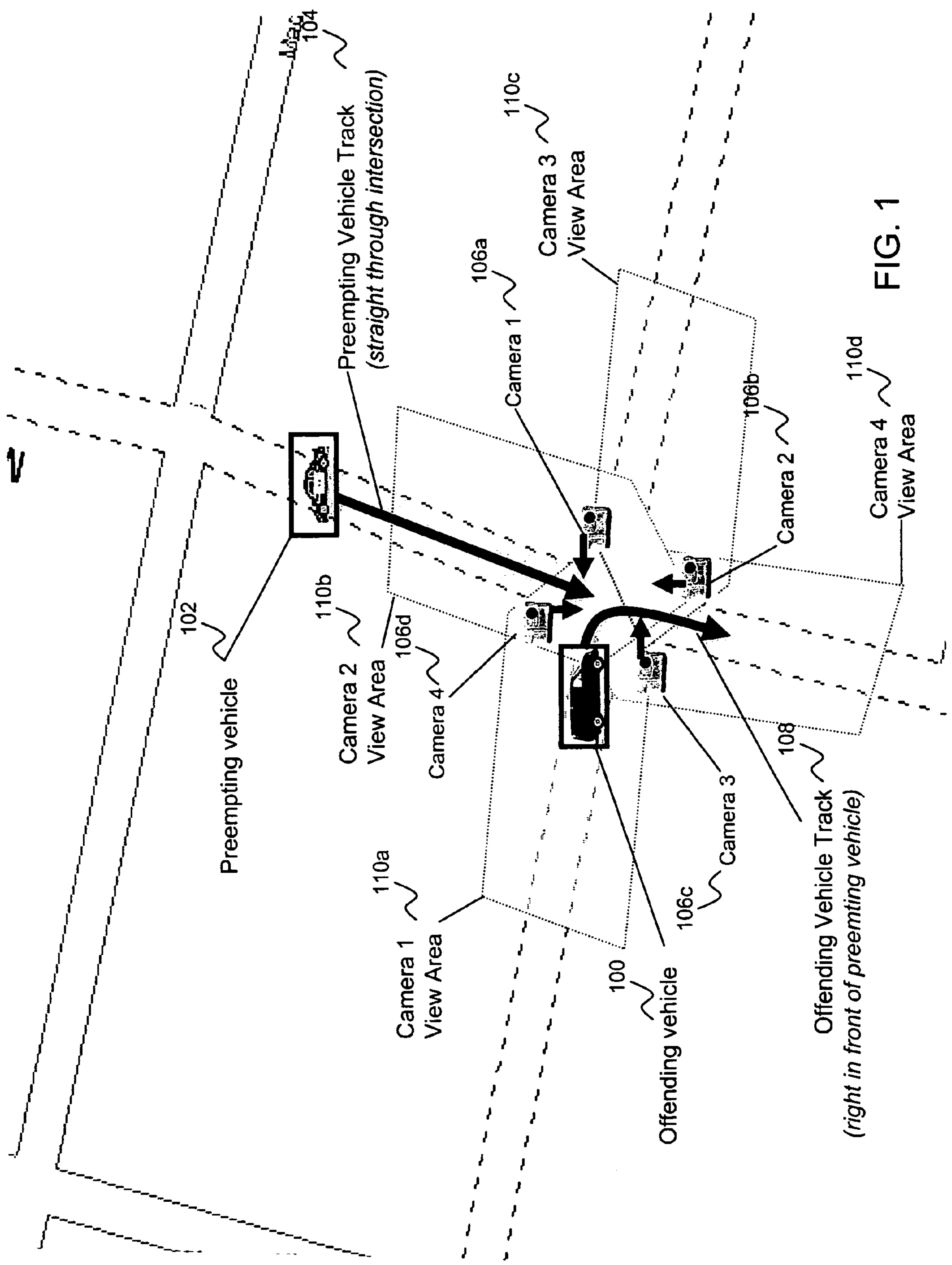
FIG. 1 is a schematic diagram of a street intersection equipped to detect and enforce yield laws for preempting vehicles according to one embodiment of the invention.

FIG. 1 is a schematic diagram of an intersection equipped to detect and enforce yield laws for preempting vehicles according to one embodiment of the invention. In the illustrated diagram, a preempting vehicle 102 travels along a vehicle track 104 and approaches an inbound intersection surveyed by four cameras 106*a*–106*d*. An offending vehicle 100 is illustrated as making a right turn at the intersection, right in front of the preempting vehicle, as indicated by vehicle track 108. According to one embodiment, all of the four cameras capture a video or still image of the offending vehicle 100 according to their various view areas 110*a*–110*d* for later analysis at a processing facility. If the license plate or any other type of vehicle identification is captured by the cameras and recognized via an optical character recognition program (OCR) at the processing facility, a citation or ticket is automatically issued and mailed to the offending motorist.

Figure 2:
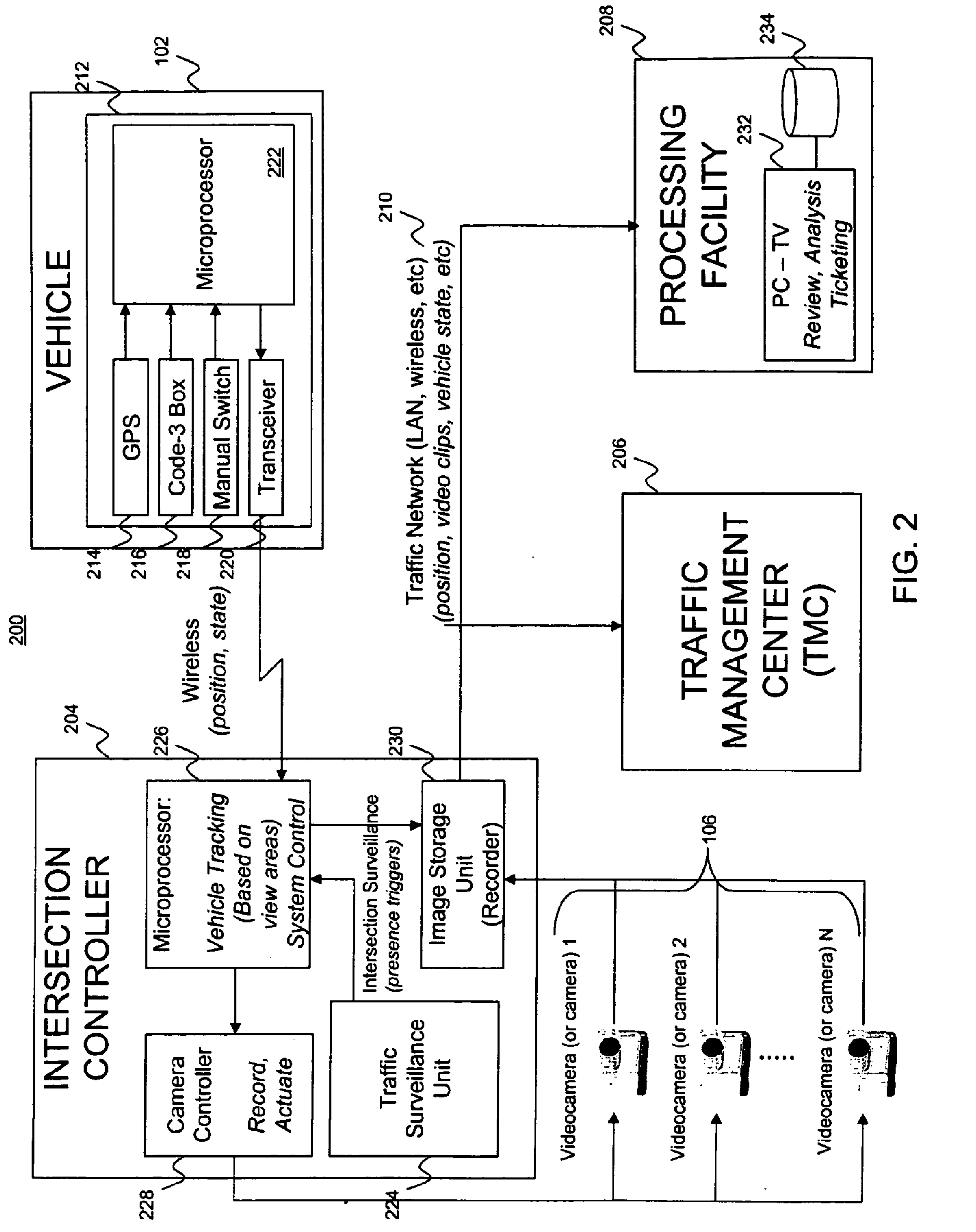
FIG. 2 is a schematic block diagram of a traffic signal preemption system configured to detect and penalize vehicles failing to yield to preempting vehicles in violation of existing yield laws according to one embodiment of the invention.

Considering the above, FIG. 2 is a schematic block diagram of a traffic signal preemption system 200 configured to detect and penalize vehicles failing to yield to preempting vehicles in violation of existing yield laws (hereinafter referred to as offending vehicles) according to one embodiment of the invention. According to the illustrated embodiment, the preemption system 200 includes a preempting vehicle 102 equipped with hardware and/or software for communicating with an intersection controller 204 and/or one or more vehicle or pedestrian traffic lights (not shown) at an inbound intersection. The intersection controller 204 controls one or more cameras 106 for visually surveying the inbound intersection and generating video or still images of traffic near the intersection.

The intersection controller 204 is coupled to a traffic management center 206 and processing facility 208 over a data communications network 210, such as, for example, a local or wide area network. The intersection controller 204, traffic management center 206, and processing facility 208 access the data communications network 210 via wired or wireless data communication links. According to one embodiment of the invention, the preempting vehicle 102 may also access the data communications network 210 for directly communicating with the traffic management center 206 and/or processing facility 208.

According to one embodiment of the invention, the preemption vehicle 102 includes a vehicle transponder box 212 providing hardware and software for wirelessly communicating with the intersection controller 204, other emergency vehicles, the traffic management center 206, and/or the processing facility 208. The vehicle transponder box 212 may be implemented using suitable hardware from any known preemption system. According to the illustrated embodiment, the hardware and preemption technique described in U.S. patent application Ser. No. 10/811,075 is used to implement the vehicle transponder box 212. According to this embodiment, the transponder box 212 includes a global positioning system (GPS) receiver 214, emergency code box 216, manual switch 218, and RF transceiver 220 coupled to a microprocessor unit 222.

The vehicle transponder box 212 is activated upon user actuation of a main power switch (not shown). Once actuated, the GPS receiver 214 calculates current positions of the preempting vehicle as it travels along a particular path when responding to an emergency call. The position and state of the preempting vehicle are transmitted by the microprocessor unit 222 via the RF transceiver 220 to the intersection controller 204 as a trigger signal. According to one embodiment of the invention, the position information is generated by the GPS receiver 214, and the state of the vehicle is associated with the emergency code (e.g. Code-3, Code-2, etc.) stored in the emergency code box 216.

The preempting vehicle 102 may also be equipped with an inertial navigation unit including an accelerometer, gyroscope, wheel-tachometers, and/or heading indicator. Vehicle information such as speed and acceleration may be read in real-time by the microprocessor unit 222 using an on-board diagnostic interface cable and connector (not shown). The preempting vehicle 102 may be configured to transmit to the intersection controller 204 navigation data obtained from the additional navigational devices, such as, for example, heading indicators, vehicle speed, and acceleration information.

According to one embodiment of the invention, a manual switch 218 may be invoked by an operator of the preempting vehicle for manually transmitting the trigger signal to the intersection controller 204. According to another embodiment of the invention, the manual switch 218 may be invoked after an initial trigger signal has been transmitted as a tag signal to tag portions of images captured by the cameras 106. In response to receipt of a tag signal, the microprocessor unit 226 inserts a marker into a portion of the captured image as a flag that extra attention should be given to the marked portion of the image during analysis at the processing facility 208. For example, an operator of the preempting vehicle may transmit a tag signal via the manual switch if the operator detects an offending vehicle.

According to one embodiment of the invention, the vehicle transponder box 212 is integrated into the preempting vehicle itself, such as, for example, in the vehicle's dashboard. According to another embodiment of the invention, the vehicle transponder box 212 may be included into a portable device commonly carried by a person operating the vehicle, such as, for example, a cellular phone, personal digital assistant (PDA), mini-PC, and the like.

In other embodiments, other GPS-based preemption techniques are used in the preemption vehicle 102. In further embodiments, optical preemption techniques such as those used in the Opticon system manufactured by the 3M Company of St. Paul, Minn. are used. Other embodiments may utilize preemption systems based on sirens. In yet another embodiment, a transponder without preemption capabilities may be used to simply indicate to the intersection controller 204 the presence of an emergency vehicle. Regardless of the technique used, a request by a requesting vehicle for right of way, either by preemption of traffic lights or by any other conventional mechanism, is hereinafter referred to as a trigger signal.

According to one embodiment of the invention, the intersection controller 204 is a conventional intersection controller such as, for example, a NEMA TS2 M52 Controller manufactured by Siemens ITS of Austin, Tex., possessing a plurality of preemption inputs. In other embodiments, the intersection controller 204 may be implemented using other types of controllers such as, for example, 170, 270 and other NEMA (North American Electrical Manufacturers) standard controllers.

According to one embodiment of the invention, the intersection controller 204 includes a traffic surveillance unit 224 equipped with necessary hardware and/or software for receiving trigger signals from preempting vehicles 102. For example, if the preemptive trigger signal is transmitted as an RF signal, the traffic surveillance unit 224 includes an RF transceiver that receives the trigger signal and forwards all or a portion of the signal to the microprocessor unit 226. If optical or audio preemption techniques are utilized, the traffic surveillance unit includes optical or audio processors for recognizing an optical or audio preemptive trigger signal.

According to one embodiment of the invention, the traffic surveillance unit 224 includes a traffic loop detector and associated memory which are well known to those of skill in the art. The traffic loop detector is configured according to conventional mechanisms for obtaining traffic flow information, including vehicle types, vehicle speeds, lane occupancy, and lane speeds.

Upon receipt of a trigger signal by the traffic surveillance unit 224, the unit signals the microprocessor unit 226 that preemption and/or visual surveillance is desired for the preempting vehicle 102 approaching the intersection. In response, the microprocessor unit 226 invokes a camera controller 228 for initiating visual surveillance of the intersection via the one or more cameras 106. The camera controller 228 transmits a record command to the video cameras at a start of the surveillance period, causing moving or still images in the view areas 110*a*–110*d* (FIG. 1) of the cameras to be captured. When the surveillance period is over, the microprocessor unit 226 invokes the camera controller 228 to transmit a termination command to the cameras.

According to one embodiment of the invention, if the trigger signal includes position information of the preempting vehicle, the microprocessor unit 226 uses the position information to calculate an estimated time of arrival of the vehicle in a field of view of one of the cameras, and sets the estimated time of arrival as the start of the surveillance period. The microprocessor unit 226 also calculates an estimated time in which the vehicle is to clear the field of view of all of the cameras, and sets this time as an end of the surveillance period.

The video or still images captured by the cameras 106 during the surveillance period are recorded in an image storage unit 230 coupled to the cameras. According to one embodiment of the invention, portions of the images may be tagged with markers based on manual tag signals received from the preempting vehicle 102, or based on automatic detections by the traffic loop detector of possible traffic violations.

According to one embodiment of the invention, the video or still image data stored in the image storage unit 230 is downloaded to the traffic management center 206 and processing facility 208 over the data communications network 210 at predetermined download times. According to another embodiment, the downloading occurs in response to an express offload request received by the intersection controller 204.

The intersection controller 204 may transmit other data to the traffic management center 206 and processing facility 208 in addition to the image data. Such additional data includes, but is not limited to, position and emergency code of the preempting vehicle 102, preemption status of the intersection, intersection phase information, diagnostics information, configuration information, vehicle speed information, geographic location of the intersection, and/or the like. According to one embodiment of the invention, the traffic management center 206 may control preemption of traffic lights and/or control the cameras 106 at the intersection based on the received data.

The processing facility 208 includes a personal computer (PC) 232 or PC-TV for analyzing the image data and issuing citations to violators of yield laws. According to one embodiment of the invention, citations and tickets may also be issued for other types of traffic violations captured by the cameras.

The PC 232 is equipped with software that detects portions of the image data tagged with one or more markers. The PC 232 is also configured with an OCR program for recognizing vehicle identifiers, such as, for example, license plate numbers, captured by the cameras 106. The PC 232 is further coupled to a database 234 storing contact and/or vehicle information for each vehicle identifier. The contact and/or vehicle information is retrieved for mailing citations for traffic violations. The database 234 may also include different types of citations and tickets that may be retrieved based on an identified traffic violation.

According to the illustrated embodiment, the traffic management center 206 is separate from the processing facility 208. A person of skill in the art should recognize, however, that both the traffic management center 206 and processing facility 208 may reside in one or more processors housed within a single facility.

According to one embodiment of the invention, the intersection controller 204 may include or be coupled to a preemption device (not shown). Preemption inputs to the intersection controller 204 are used by the preemption device to decide whether preemption of the traffic signals should occur, and if preemption is to occur, to control the traffic signals to preempt the intersection in a manner required by the preempting vehicle.

The preemption device may be a binary preemption device or a position-based preemption device. In a binary preemption system, preemption is turned on or off based on trigger signals. In a position-based preemption device, positioning telemetry, such as, for example, GPS technology, is used to determine the position of the preempting vehicle for granting preemption. Position-based preemption is described in further detail in U.S. patent application Ser. No. 10/811,075.

According to another embodiment of the invention, the intersection controller 204 may be part of existing red-light running and surveillance technology well known to those of skill in the art. Red-light running and surveillance technology make use of cameras, microprocessors, camera controllers, traffic loop detectors, and image storage units. These components already existing in the red-light running and surveillance technology may be adapted to also detect failure-to-yield scenarios described above with respect to FIG. 2. As an example, Precision Traffic Systems (PTS) of Austin, Tex. is a red-light running product that uses advanced object recognition techniques. These techniques may be used to enhance or replace traffic loop inputs for automatic detection of potential violations at the intersection controller.

Figure 3:
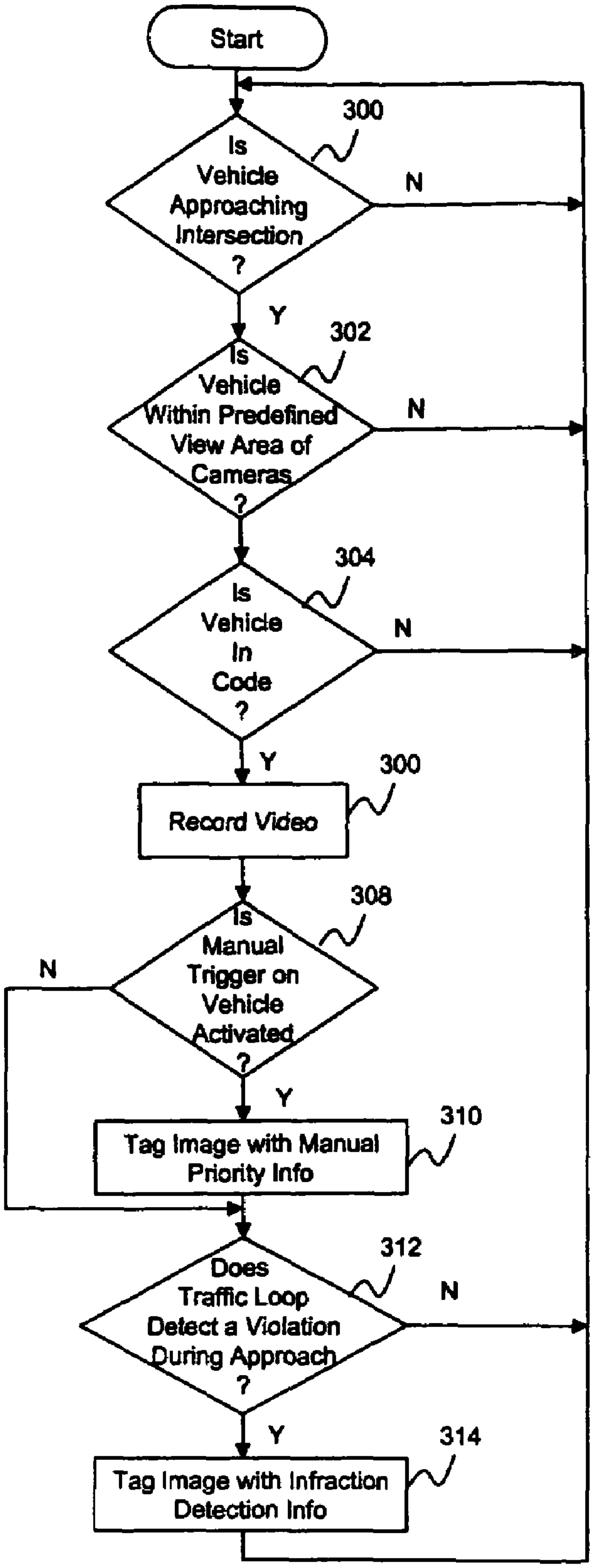
FIG. 3 is a flow diagram of a process executed by an intersection controller for automatic triggering cameras for visual surveillance according to one embodiment of the invention.

FIG. 3 is a flow diagram of a process executed by the intersection controller 204 for automatic triggering of the cameras 106 for visual surveillance according to one embodiment of the invention. In step 300, a determination is made as to whether the preempting vehicle 102 is approaching an intersection controlled by the intersection controller 204. This determination may be made based on the trigger signal provided by the preempting vehicle 102. In a position-based preemption system, the trigger signal includes vehicle position and state information.

According to one embodiment of the invention, if a determination is made that the preempting vehicle 102 is approaching the intersection, a further determination is made in step 302 as to whether the emergency vehicle 102 has entered a predefined surveillance zone, such as, for example, a zone surrounding view areas 110*a*–110*d* (FIG. 1) of the various cameras 106. In a position-based preemption system, this determination may be made based on calculations from the position information transmitted in the trigger signal.

If the preempting vehicle 102 is determined to have entered the surveillance zone, and has further transmitted a valid emergency code as its status, as is determined in step 304, the microprocessor starts a surveillance period and invokes the camera controller 228 to transmit a record command to the cameras 106 in step 306. The cameras start recording in response to the record command, and continue recording until a termination command is received at an end of the surveillance period.

According to another embodiment of the invention, such as, for example, in a binary preemption system, receipt of the trigger signal automatically activates visual surveillance by the intersection controller. That is, step 302 of verifying whether the preempting vehicle is within the surveillance zone before activating the cameras is skipped. Instead, the surveillance period begins upon receipt of the trigger signal.

The cameras 106 record full-motion video or still images of vehicles, pedestrians, and the like, within the view areas 110*a*–110*d*, until the surveillance period is over. According to one embodiment of the invention, the surveillance period is over at about the time the preempting vehicle is calculated to be outside of the surveillance zone, which is at least determined to be the time at which the preempting vehicle 102 is calculated to have cleared the intersection or cleared the field-of-view of the cameras.

According to one embodiment of the invention, the microprocessor determines whether a manual tag signal was received from the preempting vehicle 102. If the answer is YES, the portion of the video or still image captured around the time that the manual tag signal was received is tagged with a marker. The marker may contain visual and/or audio indicators, text, graphics, and the like.

In the embodiment where the traffic surveillance unit 224 includes a traffic loop detector, a determination is made in step 312 as to whether the traffic loop detector or other violation detection has detected a traffic violation during the surveillance period. This may be done, for example, based on a comparison of detected traffic patterns at the intersection with various traffic policies maintained, for instance, at a database at the intersection controller. Techniques used by red-light running systems may also be used to automatically detect violations. Automatic detection of traffic violations at intersections (such as red-light running) are well known to those of skill in the art. Based on the comparison, the microprocessor inserts, in step 314, a video and/or audio marker on a portion of the video or still image captured at a time in which the particular traffic pattern is detected.

For example, the detection of the traffic loop detector of a right-on-red action that is orthogonal to the preemption direction may be deemed to be a high-probability violation case. Thus, upon detection of such an action, the microprocessor 226 automatically inserts a marker into the captured images as an alert during analysis of the images.

The marker inserted automatically upon detection of a particular traffic pattern may be of a similar type as the marker inserted in step 310, but distinguishable from the marker inserted in step 310. According to one embodiment of the invention, additional information may be inserted into the captured video or image along with an automatically inserted marker, such as, for example, the detected traffic pattern, details on a potentially violated traffic policy, and the like.

The images recorded by the cameras 106 are stored in the image storage unit 230. According to one embodiment of the invention, the images may be cataloged into particular files or folders, where a separate file or folder is generated for each surveillance period, download period, day of the week, or the like.

The recorded images are cataloged until an express offload request is received by the microprocessor 226. The offload request may be transmitted by the traffic management center 206 and/or the processing facility 208. According to another embodiment of the invention, the recorded images are automatically downloaded to the traffic management center 206 and/or processing facility 208 according to a predetermined download schedule.

Once received by the processing facility 208, the recorded images are analyzed by the PC 232 for automatically issuing tickets for detected violations. According to one embodiment of the invention, all or a portion of the analysis process is automated. For example, the PC 232 may automatically scan the images for any markers inserted into the images, and bring images associated with the markers to the attention of a person analyzing the images. If additional data associated with the markers exist, such data may also be brought to the person's attention.

According to one embodiment of the invention, an OCR program may automatically attempt to recognize vehicle identifiers, such as, for example, vehicle license plate numbers, of offending vehicles. If the vehicle identifier is recognized, the database 234 is automatically searched for contact information of a person to receive a citation for the violation, and any additional vehicle information. The recognized vehicle identifier and associated contact and/or vehicle information are then displayed for verification by the person analyzing the images.

According to another embodiment of the invention, the PC may be configured to automatically retrieve appropriate citations from the database 234 (FIG. 2) based on the detected potential offenses. Upon verification by the person analyzing the images that an offense has occurred, the PC may merge the vehicle identification information, contact information, and the like, into appropriate fields of the retrieved citation. The citation is then transmitted according to conventional mechanisms.

Figure 4:
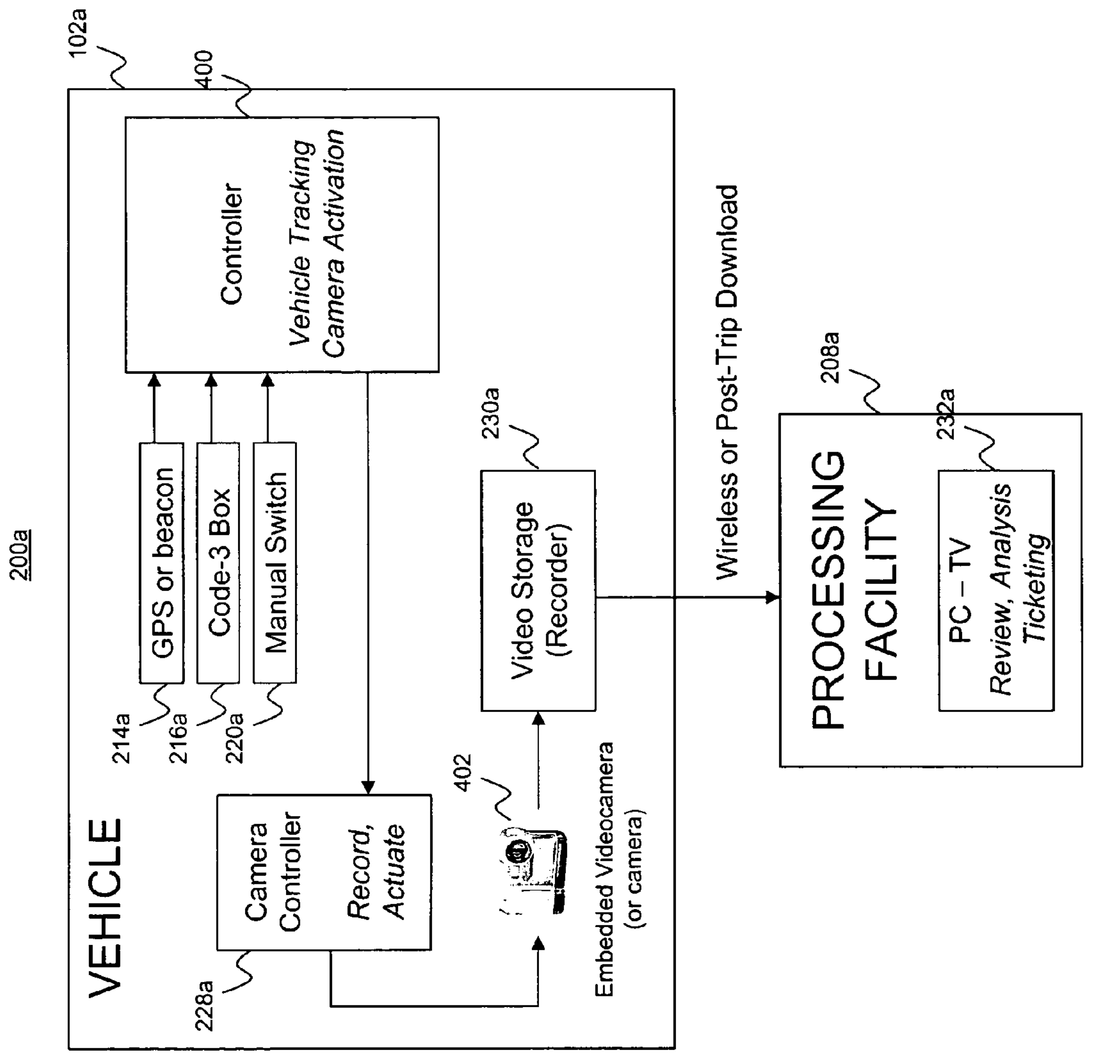
FIG. 4 is a schematic block diagram of a traffic signal preemption system configured to detect and penalize offending vehicles according to another embodiment of the present invention.

FIG. 4 is a schematic block diagram of a traffic signal preemption system 200*a* configured to detect and penalize offending vehicles according to another embodiment of the present invention. In the illustrated embodiment, one or more surveillance cameras 402 similar to the cameras 106 of FIG. 2 are embedded in the preempting vehicle 102*a* itself. The camera 402 is controlled by a camera controller 228*a*, which may be similar to the camera controller 228 of FIG. 2, based on commands transmitted by controller 400. The images captured by the camera 402 are stored in an image storage unit 230*a* which may be similar to the image storage unit 230 of FIG. 2.

According to one embodiment of the invention, one or more cameras 402 are embedded into one or more mirrors, mirror housings, windshields, bumpers, hood, any portion of the preempting vehicle 102*a*. If multiple cameras are used, the cameras may be angled so as to collectively provide a 360 degree view of an area surrounding the vehicle.

The preempting vehicle 102*a* is further equipped with a GPS receiver 214*a* or another type of positioning telemetry unit, emergency code box 216*a*, manual switch 218*a*, and transceiver 220*a*, which may be similar to the GPS receiver 214, emergency code box 216, manual switch 218, and RF transceiver 220 of FIG. 2.

According to one embodiment of the invention, the controller 400 is a microprocessor-based controller configured with at least a portion of the functionalities of microprocessor units 222, 226. In this regard, the controller 400 determines whether to activate the one or more embedded cameras 106. According to one embodiment of the invention, the controller 102*a* automatically invokes the cameras via the camera controller 228*a* when the vehicle approaches an intersection if the emergency code box 216 indicates that the vehicle is responding to an emergency call. According to another embodiment of the invention, the cameras may also be manually actuated by an operator of the vehicle via the manual switch 218*a*.

According to the embodiment illustrated in FIG. 4, the recorded images may be downloaded to a processing facility 208*a* over wired or wireless data communication links during a post-trip download session. A PC 232*a* in the processing facility then proceeds to review, analyze, and automatically issue citations as is described above with reference to PC 232 of FIG. 2.

According to a further embodiment of the invention, the illustrated components of the preemption vehicle 102*a* may instead be located in a cellular phone, PDA, mini-PC, or any other portable device commonly carried by a person operating the vehicle 102*a*.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. For example, although the above embodiments have been described with respect to traffic preemption systems, a person of skill in the art should recognize that the present invention may also be practiced in other types of traffic control or detection systems.

It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A system for detecting and enforcing violation of traffic laws, the system comprising:

a transmitter wirelessly transmitting a trigger signal;

at least one image capture device capturing a plurality of images within a view area of the image capture device;

a controller unit in communication with the transmitter and the image capture device, the controller unit receiving the trigger signal and in response, transmitting an image capture command to the image capture device for initiating capture of the plurality of images, the controller unit further tagging a portion of the captured images, the tagged portion including images associated with a violation of a traffic law; and a processing unit receiving the captured images and analyzing the tagged portion of the captured images, the processing unit automatically issuing a citation for the violation of the traffic law associated with the tagged portion.

2. The system of claim 1, wherein the controller unit controls traffic flow at a street intersection.

3. The system of claim 2, wherein the controller unit preempts traffic signals at the intersection in response to the trigger signal.

4. The system of claim 1, wherein the view area of the image capture device includes at least a portion of a street intersection.

5. The system of claim 1, wherein the violation of the traffic law is a failure to yield to an emergency vehicle.

6. The system of claim 1, wherein the transmitter is included in a vehicle, and the trigger includes position information of the vehicle.

7. The system of claim 6, wherein the controller unit determines a start of a surveillance period based on the position information, and transmits the image capture command at the start of the surveillance period.

8. The system of claim 7, wherein the start of the surveillance period corresponds to an estimated arrival time of the vehicle at a surveillance zone.

9. The system of claim 8, wherein the surveillance zone is defined by the view area of the image capture device.

10. The system of claim 1, wherein the tagging of the portion of the captured images is in response to receipt of a second signal from the transmitter.

11. The system of claim 1, wherein the tagging of the portion of the captured images is in response to a determination that a potential traffic violation exists based on data output by a traffic loop detector.

12. In a system for detecting and enforcing violation of traffic laws, a controller unit in communication with a vehicle and an image capture device, the controller unit comprising:

a receiver wirelessly receiving a trigger signal from the vehicle;

means for determining, based on the trigger signal, whether the vehicle is in a predetermined surveillance zone;

means for actuating the image capture device in response to a determination that the vehicle is in the predetermined surveillance zone;

means for tagging a portion of the captured images, the tagged portion including images associated with a violation of a traffic law;

a data store storing the captured images; and means for transmitting the stored images to a processing unit, the processing unit analyzing the tagged portion of the captured images and automatically issuing a citation for the violation of the traffic law associated with the tagged portion.

13. The controller unit of claim 12 further comprising means for preempting traffic signals at a street intersection in response to the trigger signal.

14. The controller unit of claim 12, wherein the surveillance zone includes a view area of the image capture device.

15. The controller unit of claim 12, wherein the violation of the traffic law is a failure to yield to the vehicle.

16. The controller unit of claim 12, wherein the trigger includes position information of the vehicle.

17. The controller unit of claim 12, wherein the means for tagging tags a portion of the captured images in response to receipt of a second signal from the transmitter.

18. The controller unit of claim 12 further including a traffic loop detector, wherein the means for tagging tags a portion of the captured images in response to a determination that a potential traffic violation exists based data output by the traffic loop detector.

19. A computer-implemented method for detecting and enforcing violation of traffic laws, the method comprising:

wirelessly receiving a trigger signal from a vehicle;

determining, based on the trigger signal, whether the vehicle is in a predetermined surveillance zone;

actuating the image capture device in response to a determination that the vehicle is in the predetermined surveillance zone;

tagging a portion of the captured images, the tagged portion including images associated with a violation of a traffic law;

storing the captured images; and transmitting the stored images to a processing unit, the processing unit analyzing the tagged portion of the captured images and automatically issuing a citation for the violation of the traffic law associated with the tagged portion.

20. The method of claim 19 further comprising preempting traffic signals at a street intersection in response to the trigger signal.

21. The method of claim 19, wherein the surveillance zone includes a view area of the image capture device.

22. The method of claim 19, wherein the violation of the traffic law is a failure to yield to the vehicle.

23. The method of claim 19, wherein the trigger includes position information of the vehicle.

24. The method of claim 19, wherein the tagging includes tagging a portion of the captured images in response to receipt of a second signal from the transmitter.

25. The method of claim 19, wherein the tagging includes tagging a portion of the captured images in response to a determination that a potential traffic violation exists based data output by the traffic loop detector.

* * * * *